United States Patent Office 2,897,154
Patented July 28, 1959

2,897,154

BLEACHING AND DISINFECTING COMPOSITIONS

Laszlo L. Low, La Habra, Calif., assignor to Purex Corporation, Ltd., South Gate, Calif., a corporation of California No Drawing. Application July 30, 1956
Serial No. 600,694

13 Claims. (Cl. 252—99)

This invention relates generally to improved dry bleaching and disinfecting compositions employing generally the combination of inorganic salts and trichlorocyanuric acid (known also as trichloroisocyanuric acid and trichloroiminocyanuric acid) as a source of bleaching or disinfecting agent upon dissolution in water. The invention more specifically and primarily is concerned with new and improved bleaching or disinfecting materials employing trichlorocyanuric acid, and which, by reason of their particular composition, have significantly beneficial relation to the trichlorocyanuric acid in obviating the later discussed odor conditions. While overcoming the odor problem, I am able to benefit the entire composition in a number of respects, including the promotion of quick solubility and accelerated release of chlorine from the acid in water solution, and provision of a uniform and free-flowing admixture rendering the composition especially desirable for use in the field of household bleaches and disinfectants.

Speaking first with particular reference to problems and conditions arising through the use of trichlorocyanuric acid as a bleaching agent, and mixtures thereof with salts, it is found that unless prepared and specially compounded to solve the odor problem, these materials possess a kind and degree of instability which renders them unacceptable for general consumer use. The instability and undesirability from a consumer standpoint results from the apparent tendency, under ordinary atmospheric and other conditions to which a packaged composition containing trichlorocyanuric acid or water soluble salt mixtures thereof would be subjected, for the acid to undergo a partial decomposition, which appears to be catalyzed or otherwise accelerated by many admixed components. The result is an evolution from the trichlorocyanuric acid of highly noxious and otherwise objectionable voltailes which appear to be chloramines such as $NH_2Cl$ and $NCl_3$.

One major object of the invention is to incorporate in the product what may be referred to as an odor stabilizing or deodorizing agent, the effect of which is to convert the otherwise noxious volatiles such as $NH_2Cl$ and $NCl_3$ to inoffensive decomposition products. In serving this function, the odor stabilizing agent is effective whether the component responsible for odorous release from the trichlorocyanuric acid be incorporated in the product admixture, within or independently of any spray-dried component. Usually it will be preferred for the making of household bleaches and disinfectants, to include one or more of the components in a spray-dried, free-flowing and quick-dissolving form. Thus the product formulation may comprise, for example, the combination of trichlorocyanuric acid uniformly mixed with spray-dried base particles containing the odor stabilizing agent and one or more water soluble salt components going to make up the composite product, or the odor stabilizing agent may be dry mixed with the trichlorocyanuric acid and this mixture admixed with an essential builder salt spray-dried base.

At this point it may be mentioned that the proportion of trichlorocyanuric acid in the product is not critical and may vary between concentrations as low as around one percent, where the product is designed to serve as a relatively mild disinfectant or bleaching cleanser, to percentages as high as ninety-nine percent, where potent bleaching power is desired.

We have previously referred to the tendency of commercial trichlorocyanuric acid to evolve lachrymatory chloramines, and to the apparent tendency of the usual alkaline builder or base salts such as the sodium phosphates and carbonates and the alkali metal sulfates, to increase the chloramine releasing tendencies of the acid under normal temperature conditions. The present invention affords one effective solution of the problem of how to overcome such odor conditions characteristic of trichlorocyanuric bleaching and disinfecting compositions.

As to the deodorants, I have found that certain compounds will serve this function effectively, apparently by conversion of evolved chloramine to non-lachrymatory volatiles. All the reasons for the chloramine evolution, and for its conversion to unobjectionable compounds by the materials named below, are not fully understood. But it has been determined that such materials are effective and that they are well suited for incorporation in household as well as commercial bleaches and disinfectants. I have found that relatively small quantities of any of the following, admixed as in finely divided or spray-dried form with the acid, will effectively overcome the odor condition that otherwise would exist: silver nitrate, silver phosphate, silver oxide, silver carbonate and mercuric nitrate.

It will be understood that the product may be made in partially spray-dried form according to any of various possible formulations differing in the selection or presence of the compounds as between spray-dried and non-spray dried components. In general, it is only necessary to avoid admixing in a wet state, as in a water slurry, the trichlorocyanuric acid with a strongly alkaline compound. Thus slurrying of the acid with a strongly alkaline builder salt should be avoided. On the other hand, the acid may be slurried for spray drying with any of the above mentioned deodorants, or with an acid, neutral or low alkalinity builder salt. These considerations thus permit of such various possibilities as compounding the acid with separately formed spray-dried beads containing the builder salt, e.g. phosphate and salt cake, and also one or more of the silver or mercury compounds named above; or the deodorant may be omitted from the spray-dried particles and mixed with the acid; or as indicated, the acid may be slurried and spray-dried with the deodorant, builder salts and a surfactant.

In general the product compositions may range in weight percentages between about 1% to 99% trichlorocyanuric acid (say from 5% to 15% in household bleaches and from 15% to 50% in commercial bleaches). As to the quantity of deodorizing agent, this may vary in the weight percentage of about 0.01% to 10%. The builder salt content (including any added or other binder) may range between about 0% to 99%.

As to the water soluble builder salt content of the base, the latter may be formed by spray-drying an aqueous slurry of any of a variety of mixtures of such water soluble salts as the alkali metal phosphates, including tripolyphosphate, pyrophosphate, orthophosphate, and hexameta phosphate as well as such other readily soluble salts as the alkali metal sulfates, silicates and chlorides. As indicated, when formed by spray-drying methods used in the manufacture of spray-dried synthetic detergents, the resulting beads will be formed to possess the exceptionally desirable qualities of hardness and resistance to dusting in packages, and rapid solubility of all the salts notwithstanding the firmness of the beads.

In the interests of obtaining greater strength in the spray-dried beads, it may be desirable to use a binder component, in addition to those referred to above, which additive will contribute greatly to bead-building properties and yield exceptionally strong spray-dried globular hollow particles. For this purpose, alkali metal, e.g. sodium, silicate in any of various grades ranging in $Na_2O:S:O_2$ ratios between 1:3.2 to 1:1, may be used, and in variable amounts typically between about 3% to 30% of the spray-dried components.

In relation to the trichlorocyanuric acid, the spray-dried base, with or without the acid being incorporated in the spray-dried particles, serves the odor stabilizing function discussed in the foregoing, where the deodorant is included in the base, and in all instances promotes rapid dissolution in water of the acid and release of its available chlorine. The base quickly dissolves, forming an alkaline solution in which the acid has accelerated solubility, giving resultant immediate release of its chlorine.

The inclusion in the product, typically in the spray-dried particles, of a detergent or surface active agent is usually desirable though not essential. Any of the large numbers of surface active agents known to be suitable for spray-drying, may be used. These include the soaps and synthetic detergents, non-ionic or anionic, of which the widely used sodium alkyl benzene sulfonates are typical. The detergent content need not exceed say 5% of the product.

There may also be included, as shown by the examples, miscellaneous additive compounds well known to those skilled in the art of the particular composition containing the trichloroisocyanuric acid. For example, optical dyes or "brightening agents" which are stable to active chlorine compounds may be added as is the practice in the formulation of heavy-duty synthetic detergent compositions. In some cases a white mineral oil may be applied to act as a de-dusting agent. Still further, abrasive materials such as silica flour, feldspar, etc. may be incorporated in cases where the objective is to provide a cleanser type product with bleaching properties. Suitable perfumes may also be included in any of the compositions if desired.

The invention will be further understood with respect to illustrative and practicably usable embodiments given by the following examples, wherein "TCCA" designates trichlorocyanuric acid having a theoretical available chlorine content of about 90%, surface active agent unless otherwise indicated, is commercial sodium dodecyl benzene sulfonate, and the percentages stated are by weight.

Example 1

This composition gives an odorless product which can be used for disinfecting swimming pools, bleaching in commercial laundries, etc.:

99.5% TCCA (trichlorocyanuric acid)
0.5% silver orthophosphate ($Ag_3PO_4$)

Example 2

The following composition is suitable as a household dry bleach:

91% of a spray-dried base (hollow globular beads) containing 3% surface active agent, 17.5% sodium tripolyphosphate and 79.5% salt cake and
9% of a premix consisting of TCCA and silver carbonate in the ratio of 8:1.

Example 3

The following composition is a household dry bleach consisting of:

5% trichloroisocyanuric acid and
95% of a spray base containing:

| | Percent |
|---|---|
| Surface active agent | 3 |
| $Na_5P_3O_{10}$ | 2 |
| AgO | 2 |
| Salt cake | 93 |

Example 4

| | Percent |
|---|---|
| TCCA | 8 |
| $Ag_3PO_4$ | 1 |
| Surface active agent (sodium lauryl sulfate) | 3 |
| Salt cake | 88 |

The above composition is suitable for a household dry bleach and can be made by dry mixing the listed ingredients together.

Example 5

| | Percent |
|---|---|
| Silica flour ($SiO_2$) 99% through 100 mesh | 82 |
| Surface active agent | 3 |
| $Na_5P_3O_{10}$ | 3 |
| Silver phosphate ($Ag_3PO_4$) | 1 |
| TCCA | 1 |
| Salt cake ($Na_2SO_4$) | 8 |
| $Na_4P_2O_7$ | 2 |

This formulation may be used as an abrasive cleaning compound and household disinfecting agent. It is preferred to preblend the TCCA with the silver compound prior to its addition to the rest of the ingredients in order to achieve maximum odor control.

Example 6

A household bleach which contains 5% TCCA, 1% $AgNO_3$ and 94% of a spray-dried base (hollow globular beads).

The spray-dried base is composed of:

1% surface active agent
3% sodium tripolyphosphate
3% sodium silicate (as a binder for the inorganic salts)
93% sodium sulfate

I claim:

1. As a product, a uniform mixture of trichlorocyanuric acid which in itself gives off lachrymatory chloramine volatiles, and a solid deodorant constituting between about 0.01 to 10% of the product acting to render the product unobjectionably lachrymatory, said deodorant being of the group consisting of silver nitrate, silver phosphate, silver oxide, silver carbonate and mercuric nitrate.

2. A a product, a uniform mixture of trichlorocyanuric acid which in itself gives off lachrymatory chloramine volatiles, and a solid deodorant constituting between about 0.01 to 10% of the product acting to render the product unobjectionably lachrymatory, said deodorant being of the group consisting of silver nitrate, silver phosphate, silver oxide, silver carbonate, and mercuric nitrate and a readily water soluble inorganic salt builder.

3. As a product, a uniform mixture of trichlorocyanuric acid which in itself gives off lachrymatory chloramine volatiles, and a solid deodorant constituting between about 0.01 to 10% of the product acting to render the product unobjectionably lachrymatory, said deodorant being of the group consisting of silver nitrate, silver phosphate, silver oxide, silver carbonate, and mercuric nitrate, and a readily water soluble inorganic salt builder, of the group consisting of alkali metal phosphates, carbonates, silicates, sulfates and chlorides.

4. As a product, a uniform mixture of trichlorocyanuric acid which in itself gives off lachrymatory chloramine volatiles, and a solid deodorant constituting between about 0.01 to 10% of the product acting to render the product unobjectionably lachrymatory, said deodorant being of the group consisting of silver nitrate, silver phosphate, silver oxide, silver carbonate, and mercuric nitrate, a readily water soluble inorganic salt builder and an organic surface active agent.

5. As a product, a uniform mixture of trichlorocyanuric acid which in itself gives off lachrymatory chloramine volatiles, and a solid deodorant constituting between about 0.01 to 10% of the product acting to render the product unobjectionably lachrymatory, said deodorant being of the group consisting of silver nitrate, silver phosphate, silver oxide, silver carbonate and mercuric nitrate, said deodorant being contained in spray-dried particles of hollow bead form.

6. As a product, a uniform mixture of trichlorocyanuric acid which in itself gives off lachrymatory chloramine volatiles, and a solid deodorant constituting between about 0.01 to 10% of the product acting to render the product unobjectionably lachrymatory, said deodorant being of the group consisting of silver nitrate, silver phosphate, silver oxide, silver carbonate, and mercuric nitrate and a readily water soluble inorganic salt builder, of the group consisting of alkali metal phosphates, carbonates, silicates, sulfates and chlorides, said builder being contained in spray-dried particles of hollow bead form.

7. As a product, a uniform mixture of trichlorocyanuric acid which in itself gives off lachrymatory chloramine volatiles, and a solid deodorant constituting between about 0.01 to 10% of the product acting to render the product unobjectionably lachrymatory, said deodorant being of the group consisting of silver nitrate, silver phosphate, silver oxide, silver carbonate, and mercuric nitrate and a readily water soluble inorganic salt builder of the group consisting of alkali metal phosphates, carbonates, silicates, sulfates and chlorides, said deodorant and builder being contained in spray-dried particles of hollow bead form.

8. As a product, a uniform mixture of trichlorocyanuric acid which in itself gives off lachrymatory chloramine volatiles, an organic surface active agent, and a solid deodorant constituting between about 0.01 to 10% of the product acting to render the product unobjectionably lachrymatory, said deodorant being of the group consisting of silver nitrate, silver phosphate, silver oxide, silver carbonate, and mercuric nitrate and a readily water soluble inorganic salt builder, of the group consisting of alkali metal phosphates, carbonates, silicates, sulfates and chlorides, said builder being contained in spray-dried particles of hollow bead form, said deodorant and base particles of hollow bead form, said deodorant and base being contained together with said organic surface active agent in spray-dried particles of hollow bead form.

9. The product defined by claim 1, in which said deodorant is silver nitrate.

10. The product defined by claim 1, in which said deodorant is silver phosphate.

11. The product defined by claim 1, in which said deodorant is silver oxide.

12. The product defined by claim 1, in which said deodorant is silver carbonate.

13. The product defined by claim 1, in which said deodorant is mercuric nitrate.

References Cited in the file of this patent

UNITED STATES PATENTS

| | | |
|---|---|---|
| 2,308,992 | Mertens | Jan. 19, 1943 |
| 2,480,579 | Holuba | Aug. 30, 1949 |
| 2,515,577 | Waldeck | July 18, 1950 |
| 2,607,738 | Hardy | Aug. 19, 1952 |
| 2,693,454 | Soule | Nov. 2, 1954 |
| 2,771,343 | Arnold | Nov. 20, 1956 |